(12) United States Patent
Roh et al.

(10) Patent No.: US 11,012,117 B2
(45) Date of Patent: May 18, 2021

(54) CONTINUOUS COMMUNICATION METHOD AND APPARATUS OF CONTACTLESS COMMUNICATION DEVICE

(71) Applicant: Samsung Electronics Co., Ltd., Gyeonggi-do (KR)

(72) Inventors: Yangwoon Roh, Gyeonggi-do (KR); Sanguk Park, Gyeonggi-do (KR); Jinyoung Park, Gyeonggi-do (KR); Myunggyun Yoon, Gyeonggi-do (KR); Heonsoon Jang, Gyeonggi-do (KR); Seyeong Cheon, Gyeonggi-do (KR); Hyunpil Kim, Gyeonggi-do (KR); Hwanjin Kim, Hwanjin (KR)

(73) Assignee: Samsung Electronics Co., Ltd

(*) Notice: Subject to any disclaimer, the term of this patent is extended or adjusted under 35 U.S.C. 154(b) by 0 days.

(21) Appl. No.: 16/593,196

(22) Filed: Oct. 4, 2019

(65) Prior Publication Data
US 2020/0112340 A1 Apr. 9, 2020

(30) Foreign Application Priority Data
Oct. 4, 2018 (KR) .................. 10-2018-0118223

(51) Int. Cl.
*H04B 5/00* (2006.01)
*H04B 5/04* (2006.01)
(Continued)

(52) U.S. Cl.
CPC ......... *H04B 5/0031* (2013.01); *H04B 5/0062* (2013.01); *H04B 5/04* (2013.01); *H04W 4/80* (2018.02); *H04W 76/14* (2018.02)

(58) Field of Classification Search
CPC ...... H04B 5/0031; H04B 5/0062; H04B 5/04; H04W 76/14; H04W 4/80
See application file for complete search history.

(56) References Cited

U.S. PATENT DOCUMENTS 9,570,218 B2 2/2017 Ketal
9,703,514 B2 7/2017 Chuang et al.
(Continued)

FOREIGN PATENT DOCUMENTS

KR 1020100058527 6/2010
WO WO 2014/065954 5/2014

OTHER PUBLICATIONS

International Search Report dated Jan. 13, 2020 issued in counterpart application No. PCT/KR2019/012764, 10 pages.

*Primary Examiner* — Tuan Pham
(74) *Attorney, Agent, or Firm* — The Farrell Law Firm, P.C.

(57) ABSTRACT

A continuous communication apparatus includes a communication interface configured for contactless communication with a different electronic device; and a processor configured to detect a trigger to initiate contactless communication with the different electronic device; determine a communication type associated with communication to be performed with the different electronic device upon detecting the trigger; set at least one parameter associated with continuous communication when the communication type is the continuous communication; and perform the continuous communication with the different electronic device on the basis of the configured parameter.

20 Claims, 9 Drawing Sheets

(51) Int. Cl.
   *H04W 76/14*     (2018.01)
   *H04W 4/80*      (2018.01)

(56) References Cited

U.S. PATENT DOCUMENTS

| | | |
|---|---|---|
| 2004/0266494 A1 | 12/2004 | Ruuska et al. |
| 2009/0147803 A1 | 6/2009 | Takayama |
| 2010/0178867 A1 | 7/2010 | Charrat |
| 2011/0199186 A1 | 8/2011 | Han et al. |
| 2014/0068247 A1 | 3/2014 | Davis et al. |
| 2014/0113551 A1 | 4/2014 | Krishnan et al. |
| 2016/0055480 A1 | 2/2016 | Shah |
| 2018/0013878 A1 | 1/2018 | Fischer et al. |
| 2018/0183495 A1* | 6/2018 | Fujii ................... H04B 5/0031 |
| 2018/0278728 A1* | 9/2018 | Kongovi ................. H04L 69/24 |
| 2019/0007286 A1* | 1/2019 | Klemetsson .......... H04W 24/08 |

* cited by examiner

CONTINUOUS COMMUNICATION METHOD AND APPARATUS OF CONTACTLESS COMMUNICATION DEVICE

CROSS-REFERENCE TO RELATED APPLICATION(S)

This application is based on and claims priority under 35 U.S.C. § 119 to Korean Patent Application No. 10-2018-0118223, filed on Oct. 4, 2018, in the Korean Intellectual Property Office, the disclosure of which is incorporated herein by reference in its entirety.

BACKGROUND

1. Field

The present disclosure relates generally to a method and apparatus for continuous data transmission and reception in contactless communication between contactless communication devices.

2. Description of Related Art

Near-field communication (NFC) technology may refer to contactless NFC technology using a frequency in a high-frequency band (e.g., about 13.56 megahertz (MHz)). NFC technology is applied to electronic devices (e.g., a mobile device or a smartphone) to provide interoperability in data communication between two devices (e.g. NFC devices), contactless smart card technology, and wireless recognition technology. NFC technology allows the use of services without a fee. NFC technology is increasingly being used for a variety of applications, such as inter-NFC device contact application services (e.g., payments, business card exchanges, and credit transfers), personal information-related application services (e.g., personal authentication services and access control services), information provision, or customized advertising services (e.g., tourist information, medical care, parking, reservation, advertising/coupons, product information, content purchase, and social networking). NFC technology quickly and easily provides a communication service through a simple one touch process (e.g., touch-and-go).

However, in a communication mode based on NFC technology (hereinafter, NFC communication), in order to transmit/receive data, due to basic constraints, it is necessary to separate two NFC devices from each other and then to position the devices close to each other (e.g., proximity or vicinity operation properties), thereby enabling normal data transmission and reception. For example, in NFC communication, one-off communication is quickly and easily performed only by placing NFC devices having NFC technology close to each other. However, in order to communicate again after a first communication process, the two NFC devices need to be separated and then to be placed close to each other, thus enabling communication. Accordingly, even though a magnetic field (e.g., an NFC field) is formed between the NFC devices (e.g., field on), a procedure from device checking to data transfer is repeatedly required after one-time communication. Therefore, the current NFC communication method using NFC technology causes inconvenience by repeatedly requiring multiple communication iterations of transmitting and receiving for transferring large-capacity data, or by requiring a plurality of short or long data transmissions, as in cable-based communication (e.g., universal asynchronous receiver/transmitter (UART) communication).

SUMMARY

The present disclosure has been made to address the above-mentioned problems and disadvantages, and to provide at least the advantages described below.

In accordance with an aspect of the present disclosure, an electronic device includes a communication interface configured for contactless communication with a different electronic device, and a processor configured to detect a trigger to initiate contactless communication with the different electronic device, determine a communication type associated with communication to be performed with the different electronic device upon detecting the trigger, set at least one parameter associated with continuous communication when the communication type is the continuous communication, and perform the continuous communication with the different electronic device on the basis of the set parameter.

In accordance with another aspect of the present disclosure, an operating method of an electronic device includes detecting a trigger to initiate contactless communication with a different electronic device, determining a communication type associated with communication to be performed with the different electronic device upon detecting the trigger, setting at least one parameter associated with continuous communication when the communication type is the continuous communication, and performing the continuous communication with the different electronic device on the basis of the set parameter.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
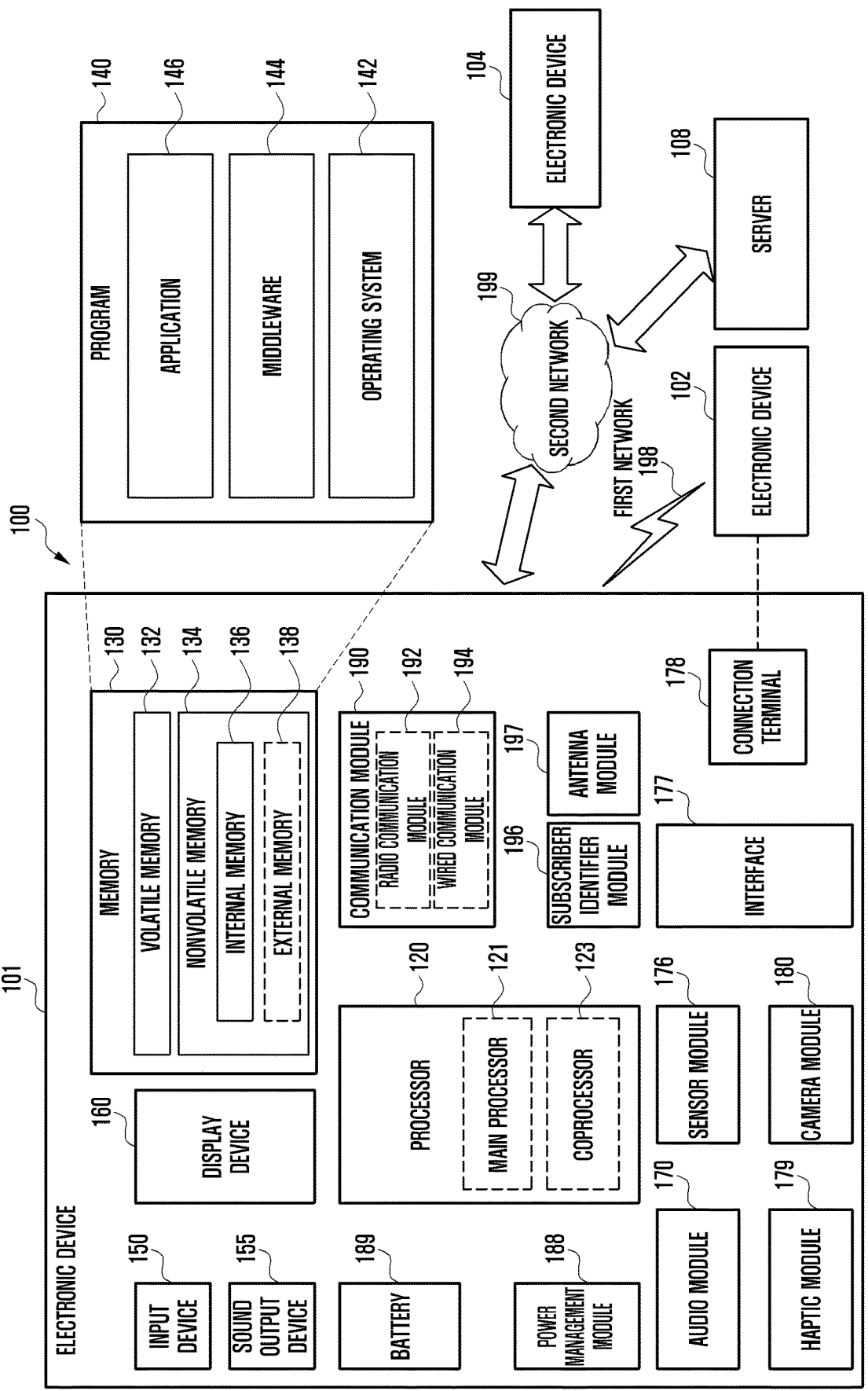
FIG. 1 is a block diagram illustrating an electronic device in a network environment, according to an embodiment.

Various embodiments of the disclosure may include a computer-readable recording medium having a program recorded thereon to perform the method by a processor.

An electronic device and an operating method thereof may enable repeated data transmission and reception without additionally separating and adjacently placing electronic devices (e.g., an initiator and a target) having contactless communication (e.g., NFC, radio frequency identification (RFID) communication, or magnetic secure transmission (MST) communication). Accordingly, an environment similar to a cable-connection (e.g., UART communication) environment may be configured using a contactless communication function (e.g., NFC function).

A wireless interface technology capable of resolving a physical connection error through contactless communication-based continuous communication technology may be provided and frequently utilized.

Once a first electronic device (e.g., an initiator) and a second electronic device (e.g., a target) that perform contactless communication are connected according to a particular protocol, it is possible to continue two-way communication between the two electronic devices using wireless continuous communication (e.g., wireless loop communication) without repeating an initialization setup operation (e.g., a session establishment operation) and a protocol setup operation. Accordingly, it is possible to configure an environment that can be used in a similar manner to that of cable-connected interface communication (e.g., UART communication).

A contactless communication mode may not require a separate electrical connection, thereby avoiding failure due to errors in a physical connection between a cable and an electronic device. Continuous communication based on contactless communication may reduce set-up time for communication compared to other wireless communication methods (e.g., Wi-Fi and Bluetooth™ technology) and may thus support fast communication. For example, NFC set-up time may be about 0.1 ms or shorter, while Bluetooth™ set-up time may be about 2 seconds or longer because it takes a considerable time for pairing and access environment setup according to a wireless standard. Further, in an environment where there are many electronic devices using different wireless communication methods (e.g., Wi-Fi and Bluetooth™), communication between electronic devices may suffer serious interference or may be impossible due to channel saturation. Therefore, when repeated data transmission and reception for only a short distance is enabled by adjusting the strength of a magnetic field on the basis of contactless communication, it is possible to form a wireless interface between two electronic devices without cable connection which is similar to a cable-connected environment, thus enabling data exchanges without restraint, and to minimize interference by neighboring devices. Additionally, it is possible to enable continuous data communication during contactless communication between electronic devices, thereby improving the usability ease, accessibility, or competitiveness of electronic devices.

A continuous communication method and a continuous communication apparatus for an electronic device which are capable of configuring an environment similar to a cable-connection (e.g., UART communication) environment using a contactless communication (e.g., NFC, RFID communication, or MST communication) function between electronic devices are provided.

A continuous communication method and a continuous communication apparatus which enable repeated data transmission and reception without any physical movement of electronic devices having contactless communication technology are provided.

A continuous communication method and a continuous communication apparatus for an electronic device which enable contactless communication between electronic devices to be used in a similar manner to that of general continuous data communication using a cable (e.g., UART communication) are provided.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module. 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type from, the electronic device 101. All or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
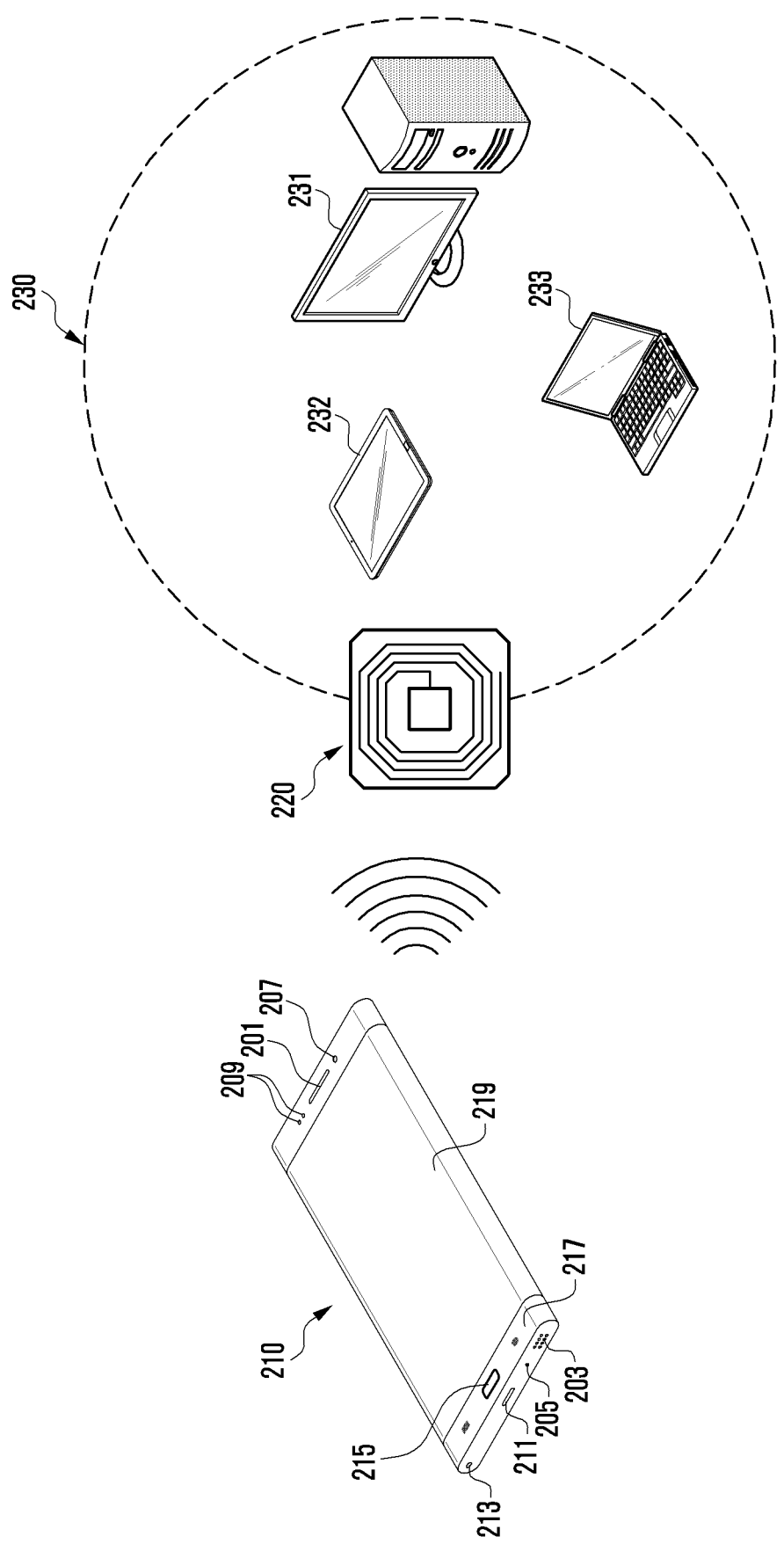
FIG. 2 illustrates a system configuration, according to an embodiment.

FIG. 2 illustrates a system configuration, according to an embodiment.

As illustrated in FIG. 2, a system (e.g., a contactless communication system) includes an electronic device 210 (hereinafter, a first electronic device 210), a bridge device (an NFC bridge device) 220 (hereinafter, a second electronic device 220), and at least one external device 230. The second electronic device 220 (e.g., the bridge device) may be included in the external device 230 to operate as a contactless communication module for contactless communication of the external device 230. Contactless communication may include at least one contactless proximity communication technique, such as NFC, RFID communication, or MST communication. Hereinafter, for convenience of description, NFC is illustrated as a representative example of contactless communication.

The second electronic device 220 may be included as an NFC module in the external device 230, or may operate as a separate device from the external device 230 and may be connected with the external device 230 via a configured communication interface. A system environment is illustrated in which the second electronic device 220 is provided separately from the external device 230 and is connected to the external device 230. The second electronic device 220 may refer to an NFC module and any device of the external device 230.

The first electronic device 210 may include a display 219, a housing (or main body) 217 which the display 219 is mounted on and is fastened to, and an additional device disposed in the housing 217 to perform a function of the first electronic device 210. The additional device may include a first speaker 201, a second speaker 203, a microphone 205, a sensor (e.g., a front camera 207 or an illumination sensor 209), a communication interface (e.g., a charging or data input/output port 211 or an audio input/output port 213), or a button 215.

The first electronic device 210 may widely refer to a device capable of communication using short-range wireless communication. The first electronic device 210 may include various portable devices, such as a cellular phone, a smartphone, a tablet personal computer (PC), or an NFC raider.

The first electronic device 210 may be connected with the second electronic device 220. The first electronic device 210 may include a short-range communication module (e.g., the wireless communication module 192) capable of supporting NFC. The first electronic device 210 may communicate with the external device 230 connected to the second electronic device 220 through the second electronic device 220. When the external device 230 is a device including the second electronic device 220. (e.g., an NFC module), the first electronic device 210 may directly communicate with the external device 230 using the communication circuit for NFC.

The first electronic device 210 and the second electronic device 220 may determine proximity to any one electronic device or perform tagging (e.g., NFC tagging) of any one electronic device as a trigger to initiate contactless communication (e.g., NFC) with the counterpart electronic device. The first electronic device 210 may operate as an NFC initiator (or originating device) or an NFC target (or receiving device). An NFC initiator may be abbreviated as an initiator, and an NFC target may be abbreviated as a target. Hereinafter, the first electronic device 210 is illustrated as operating as an initiator.

The second electronic device 220 may include a device performing NFC with the first electronic device 210. The second electronic device 220 may perform NFC with the first electronic device 210. The second electronic device 220 may be configured to communicate with (e.g., tag) the first electronic device 210, being in contact therewith. For example, the first electronic device 210 and the second electronic device 220 may perform NFC in a contact state or in a contactless state.

The second electronic device 220 may serve as a relay such that the first electronic device 210 may communicate with or may control the external device 230 (or a host device) through NFC. The second electronic device 220 may have a similar configuration to that of the first electronic device 210 illustrated above. The second electronic device 220 may operate as an initiator (i.e., an originating device) or a target (i.e., a receiving device) in NFC. Hereinafter, the second electronic device 220 is illustrated as operating as a target.

The external device 230 (or host device) may include various devices capable of being connected with the first electronic device 210 via the second electronic device 220. For example, the external device 230 may include a desktop PC 231 (hereinafter, a computer), a tablet PC 232, or a laptop PC 233 (e.g., a notebook). The external device 230 may widely refer to a device capable of communicating with or being controlled by the first electronic device 210 via the second electronic device 220. A computer is illustrated as an example of the external device 230.

The external device 230 may support one or more specified protocols used for connecting to the second electronic device 220 via a direct (or wired) interface (e.g., a serial or USB interface) or a wireless interface (e.g., non-NFC, for example, Bluetooth™, Wi-Fi, or light fidelity (Li-Fi) communication).

A variety of examples associated with an operation in which the first electronic device 210 and the second external device 220 interwork to establish a connection for communication and accordingly perform continuous communication will be described.

NFC technology may be used similarly to a UART communication mode entailing a cable connection (e.g., enabling massive data transmission and reception and continuous data communication). Provided is a method for resolving disadvantages of discontinuous (e.g. one-off) communication, which is a typical restriction on existing NFC communication technology; minimizing unnecessary delays in implementing continuous communication (e.g., loop communication); maximizing the amount (e.g., size or number of files) of data that can be transmitted at a time; and processing an error that occurs while performing communication.

Figure 3:
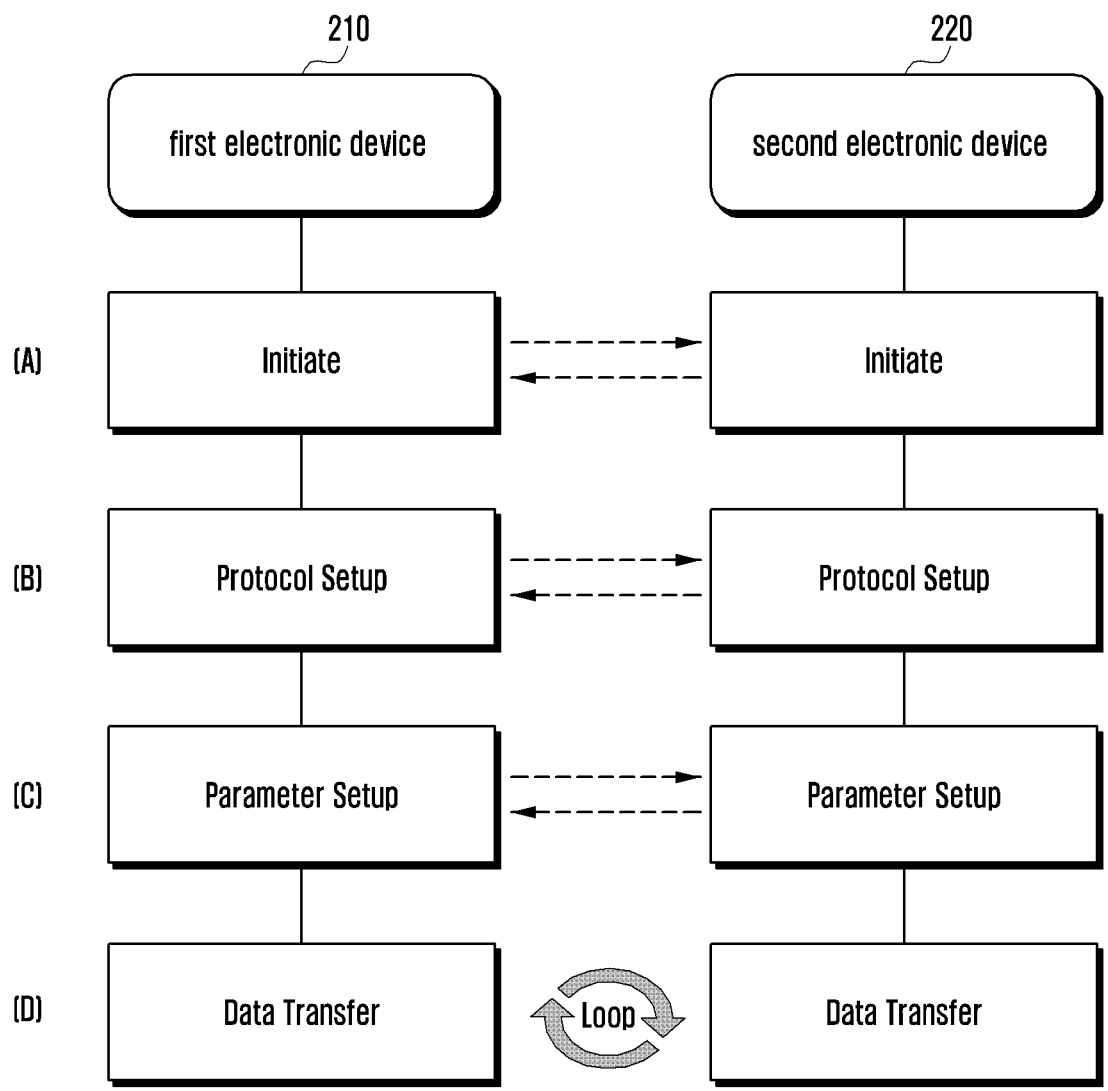
FIG. 3 schematically illustrates a continuous communication operation between electronic devices, according to an embodiment.

FIG. 3 schematically illustrates a continuous communication operation between electronic devices, according to an embodiment.

FIG. 3 illustrates an example in which a first electronic device 210 operates as an initiator and a second electronic device 220 operates as a target.

The initiator 210 may refer to an NFC device that initiates and controls NFC. The initiator may initially output electromagnetic waves, thereby initiating NFC. In this case, the wavelength of a used frequency may be, for example, about 13.56 MHz, but is not limited thereto, and various possible frequency wavelengths may be used. The initiator may actively generate electromagnetic waves (or radio frequency (RF) fields) to supply power to the target 220. Accordingly, the initiator enables the target to have a simple form factor, for example, an unpowered tag, a sticker, or a card.

The initiator may perform transmission rate selection, an initialization process, and/or a single device detection (SDD) process. Further, before generating an RF field, the initiator may further perform a collision avoidance procedure by detecting an external RF field.

The target 220 may refer to an NFC device that performs NFC with the initiator under the control of the initiator 210. The target may be a passive NFC target that is provided with an operating voltage from an RF field (or RF signal) generated in the initiator or may be an active NFC target that is capable of actively generating an RF field.

NFC between the initiator 210 and the target 220 may be performed in a manner such that the initiator transmits an RF signal including a command (e.g., a read command or write command) to the target and the target transmits an RF response signal including a response to the command to the initiator.

In NFC between electronic devices, repeated data communication may be enabled on the basis of continuous communication (e.g., loop communication). For example, after a protocol is set up (or configured) between the first electronic device 210 and the second electronic device 220, data transmission and reception between the two electronic devices 210 and 220 may be enabled.

As illustrated in FIG. 3, a method of the present disclosure may include an initialization operation (operation (A)), a protocol setup operation (operation (B)), a parameter setup operation (operation (C)), and a data transfer operation (operation (D).

Referring to FIG. 3, in operation (A), the first electronic device 210 and the second electronic device 220 initiate NFC. When the first electronic device 210 turns on an NFC function and the first electronic device 210 and the second electronic device 220 move to be within a specified range of one another, the first electronic device 210 and the second electronic device 220 may initiate NFC. The first electronic device 210 may recognize that the second electronic device 220 is within the specified range. In NFC, the operating mode (or NFC mode) of the first electronic device 210 and the second electronic device 220 may include a card emulation mode, a reader/writer mode, and a peer-to-peer (P2P) mode. The first electronic device 210 and the second electronic device 220 may operate in an initiator mode (operating as an initiator) or in a target mode (operating as a target). FIG. 3 illustrates an example in which the first electronic device 210 operates as an initiator and the second electronic device 220 operates as a target.

In the initialization operation, the first electronic device 210 may generate an RF signal to initiate NFC to thereby supply an operating voltage to the second electronic device 220, and the second electronic device 220 may provide an RF response signal to the first electronic device 210 in response to the received RF signal. In the initialization operation, the first electronic device 210 may request identification information (e.g., check a card or an ID as device identification information) about the second electronic device 220, and the second electronic device 220 may provide relevant identification information to the first electronic device 210 in response to the request from the first electronic device 210.

In operation (B), the first electronic device 210 and the second electronic device 220 perform a protocol setup operation. In the protocol setup operation, the first electronic device 210 and the second electronic device 220 may perform a negotiation operation associated with establishing (or forming) a communication channel (or a communication session) for NFC between the two electronic devices 210 and 220.

In operation (C), the first electronic device 210 and the second electronic device 220 perform a parameter setup operation. The first electronic device 210 and the second electronic device 220 may include, as a subsequent process, a negotiation operation for data communication based on continuous communication (e.g., loop communication). For example, the first electronic device 210 and the second electronic device 220 may include an operation associated with setting up various pieces of relevant information for continuous communication. The first electronic device 210 and the second electronic device 220 may include an operation of setting up at least one parameter used for continuous communication between the first electronic device 210 and the second electronic device 220 in the parameter setup operation. The parameter may include, for example, an operation of configuring application information (e.g., application ID (AID)), a command, or a data packet (e.g., a packet length or a packet segmentation). In the parameter setup operation, the first electronic device 210 and the second electronic device 220 may exchange information about the maximum length of a data packet transmitted in a subsequent process.

In operation (D), the first electronic device 210 and the second electronic device 220 perform data communication. The first electronic device 210 and the second electronic device 220 may perform data communication on the basis of discontinuous (or one-off) communication or continuous communication (e.g., loop communication) according to a communication type (e.g., long-packet data transmission or short-packet data transmission). Continuous communication may be a mode that enables the first electronic device 210 (e.g., the initiator) and the second electronic device 220 (e.g., the target) to perform continuous data transmission and reception without repeatedly performing the initialization operation after the protocol setup operation between the two devices 210 and 220. Accordingly, NFC may enable continuous data communication similar to cable communication in a cable connection environment. An operation of transmitting and receiving data on the basis of continuous communication will be described in detail below.

Figure 4:
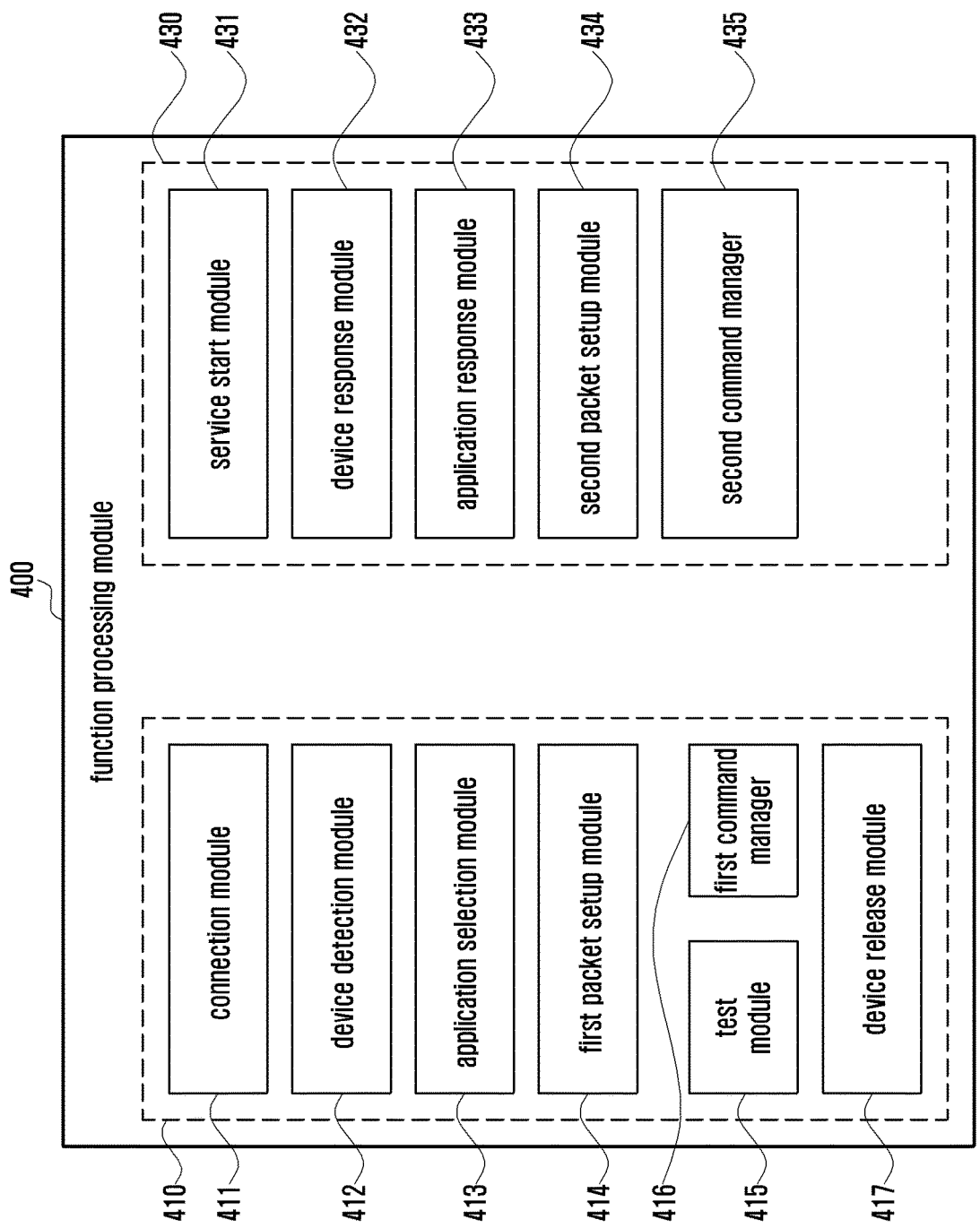
FIG. 4 illustrates a function processing module of an electronic device, according to an embodiment.

FIG. 4 illustrates a function processing module of an electronic device, according to an embodiment.

FIG. 4 illustrates a function processing module 400 that implements a function associated with an NFC-enabled electronic device for providing continuous data communication. FIG. 4 further illustrates a functional processing module 410 that enables electronic devices having an NFC function to perform repeated data transmission and reception without physical movements in order to use NFC along with communication (e.g., UART communication) entailing a cable connection. The function processing module 400 may be included as a hardware module in a processor 120 including processing circuitry in any of the electronic devices, or may be included as a software module.

In FIG. 4, reference numeral 410 may illustrate a configuration of a first electronic device 210 corresponding to the electronic device 101 operating as an initiator, and reference numeral 430 may illustrate a configuration of a second electronic device 220 corresponding to the electronic device 101 operating as a target.

FIG. 4 is a block diagram in which separately illustrated blocks may be logically distinguished elements of the electronic device 101. For example, the elements of the electronic device 101 may be configured as a single chip or as a plurality of chips depending on the design of the electronic device 101, or only relevant elements may be included and configured as a single chip or as a plurality of chips depending on the role of the electronic device 101 (e.g., an initiator or a target).

At least one of modules, data, programs, or software that implement the operation of the electronic device 101 illustrated in FIG. 4 may be stored in the memory 130 and may be executed by the processor 120.

Referring to FIG. 4, the function processing module 400 includes a first element 410 for an initiator mode and a second element 430 for a target mode. The function processing module 400 may be configured to include only one of the elements depending on the role of the electronic device 101 (e.g., an initiator or a target).

The first element 410 for the initiator mode may include a connection module 411, a device (or a card) detection module 412, an application selection module 413, a first packet setup module 414, a test module 415, a first command manager 416, or a device release module 417.

The second element 430 for the target mode may include a service start module 431, a device (or a card) response module 432, an application response module 433, a second packet setup module 434, or a second command manager 435.

Although FIG. 4 shows that at least some components (e.g., the first and second packet setup modules 414 and 434, the first and second command managers 416 and 435, the connection module 411, the service start module 431, the application selection module 413, and the application response module 433) of the first element 410 and the second element 420 are divided into the first element 410 and the second element 420, these components may be for common use and may perform different functions according to the role of the electronic device 101.

An example in which the electronic device 101 operates as an initiator will be described with reference to the first element 410.

The connection module 411 may control NFC and may initially output electromagnetic waves to initiate NFC. The connection module 411 may generate an RF signal to initiate NFC and may supply an operating voltage to a second electronic device 220 operating as a target by transmitting the RF signal through an antenna (e.g., the antenna module 197 or a loop antenna). The RF signal may include a request command (e.g., a first command) to initiate NFC.

The device detection module 412 may perform device detection (or a search) when NFC is initiated. For example, the device detection module 412 may perform an NFC device (or service) discovery procedure for NFC. The device detection module 412 may determine whether the second electronic device 220 is detected on the basis of an RF response signal in response to the RF signal. A packet structure associated with a criterion for the first electronic device 210 to determine the presence of the second electronic device 220 may be defined as illustrated in Table 1.

TABLE 1

| Field | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Description | | | | 0 | d | e | t | e | c | t | Brate | CID | NAD | | |
| Description | STX | len | | | | | cmd | | | | | | data | | ETX |

As illustrated in Table 1, field 0 may be a field relating the start of data transmission (start TX (STX)) of continuous communication; field 1 and field 2 may be fields relating to the length (len) of data (or a packet); field 3 to field 9 may be fields relating to a command (cmd); field 10 to field 13 may be fields relating to data; and field 14 may be a field relating to the end of data transmission (end TX (ETX)) of continuous communication. Information about device detection may be included on the basis of at least some (e.g., field 4 to field 9) of the command fields.

The application selection module 413 may configure application information (AID) of an application for continuous communication (e.g., repeated data transmission and reception) with an application on the second electronic device 220. The application selection module 413 may request application information about an application automatically fed back by the second electronic device 220 in response to reception of data. The application selection module 413 may configure application information on the basis of the application information received from the second electronic device 220. An example of configuring application information (AID) is illustrated in Table 2.

TABLE 2

| Field | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Description | | T len1 | T len2 | CLS | INS | P1 | P2 | C len | Application ID | | | | | |
| Description | STX | len | | APDU header | | | | | APDU Data | | | | | ETX |

As illustrated in Table 2, field 0 may be a field relating the start of data transmission (STX) of continuous communication; field 1 and field 2 may be fields relating to the length (len) of data (or a packet); field 3 to field 7 may be fields relating to a data header (e.g., an application protocol data unit (APDU) header); field 8 to field 12 may be fields relating data (e.g., APDU data); and field 14 may be a field relating to the end of data transmission (ETX) of continuous communication. Information about application information (AID) may be included on the basis of at least some (e.g., field 8 to field 12) of the data fields. By configuring application information (AID) for communication with a particular application of a target device, communication may be enabled only by an application corresponding to the configured application information, thereby resolving a security issue.

A first packet setup module 414 may set up a packet structure for data. The first packet setup module 414 may set up the packet length of data used in data communication with the second electronic device 220. The first packet setup module 414 may set up a packet length of a short packet structure for data communication by discontinuous communication (hereinafter, discontinuous data communication), an example of which is illustrated in Table 3. The first packet setup module 414 may set up a packet length of a long packet structure for data communication by continuous communication (hereinafter, continuous data communication), an example of which is illustrated in Table 4.

As illustrated in Table 4, a count (cnt, e.g., a command count) may be set up for a command (cmd), thereby maximizing a data size. It is possible to set up a command count for both a transmission (Tx) packet and a reception (Rx) packet and to transmit or receive data until the command count is 0, thereby processing the data as one packet (or data). For example, the first electronic device 210 may continuously transmit sub-packets (e.g. a first sub-packet and a second sub-packet) of one packet to the second electronic device 220 until the value of a command count (or packet count) for processing a long packet is 0, and the second electronic device 220 may continuously receive the sub-packets (e.g., the first sub-packet and the second sub-packet) until the value of a command count is 0, and may process the sub-packets as one packet.

The test module 415 may execute a repeated test (e.g., run test) for continuous data communication. The test module 415 may set up a protocol to a wrapper structure for continuous data communication when the electronic device 101 operates as an initiator. For example, referring to Table 3, the test module 415 may set up a wrapper for the repeated test using fields (e.g., field 0 to field 8 and field 13) other than fields relating to command data (e.g., field 9 to field 12) in the short packet structure. The test module 415 may perform the repeated test for continuous data communication on the basis of the configured application information (AID) and the packet length and may verify whether an error failure occurs on the basis of the test result.

TABLE 3

| Field | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Description | | T len1 | T len2 | CLS | INS | P1 | P2 | C len | cnt | Command Data | | | | |
| Description | STX | len | | APDU header | | | | | | APDU Data | | | | ETX |

TABLE 4

| Field | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Description | | T len | T len | CLS | INS | P1 | P2 | EXT | C len | C len | cnt | Command Data | | | | |
| Description | STX | len | | APDU header | | | | | | | APDU Data | | | | | ETX |

Table 3 shows an illustrative structure of a packet (e.g., a short packet of 255 bytes or less) for a short command, and Table 4 shows an illustrative structure of a packet (e.g., a long packet of 256 bytes or greater) for a short command and a long command. The buffer size of data that can be transmitted at a time may be expanded (e.g., maximized) on the basis of the structure of the packet for the short command and the long command illustrated in Table 4. For example, an extended (e.g., EXT) application protocol data unit (APDU) may be used to overcome restrictions on data in NFC. An APDU may be a unit of data exchanged between equivalent application entities in an application layer and may include application protocol control information and application layer user data.

A first command manager 416 may perform continuous command processing, rather than one-off command processing, for continuous data communication (e.g., repeated data transmission and reception). When continuous data communication is determined, the first command manager 416 may continuously process a relevant command in response to the change (e.g., a decrease) of a set-up command count according to the data size of one long packet. For example, the first command manager 416 may divide one long packet into sub-packets according to the data size (or file unit) set for one long packet and may repeatedly transmit a command when transmitting the divided sub-packets. The first command manager 416 may transmit a first sub-packet and a first command associated therewith, and may transmit a second sub-packet following transmitting the first sub-packet, and a second command associated therewith when the first sub-packet is completely transmitted (e.g., when the command count is decreased by one). The first command manager 416 may continuously transmit the individual sub-packets until the command count is 0, thus processing the sub-packets as one packet (or item of data).

The device release module 417 may perform disconnection (or separation) from the second electronic device 220 when an error (e.g., an error due to non-response from the second electronic device 220) occurs in continuous data communication with the second electronic device 220. The device release module 417 may perform temporary disconnection (or separation) from the second electronic device 220 and may establish a connection with the second electronic device 220 again via the connection module 411. The device release module 417 may perform on-off (e.g., RF field On/Off) control of electromagnetic waves (or RF field) that enables the first electronic device 210 to supply power to the second electronic device 220. Accordingly, an RF field on/off function may be defined, examples of which are illustrated in Table 5 and Table 6.

TABLE 5

| Field | 0 | 1 | 2 | 3 | 4 | 5 | 6 | 7 | 8 | 9 | 10 |
|---|---|---|---|---|---|---|---|---|---|---|---|
| Description | . | . | . | 0 | f | i | l | d | o | n | . |
| Description | STX | len | | | cmd | | | | | | ETX |

TABLE 6

| Field | 0 | 1 | 2 | 3 | 4 | 5 | 6 | 7 | 8 | 9 | 10 |
|---|---|---|---|---|---|---|---|---|---|---|---|
| Description | . | . | . | 0 | f | i | l | d | o | f | . |
| Description | STX | len | | | cmd | | | | | | ETX |

As illustrated in Table 5 and Table 6, field 0 may be a field relating the start (STX) of continuous communication; field 1 and field 2 may be fields relating to the length (len) of a packet; field 3 to field 9 may be fields relating to a command (cmd); and field 10 may be a field relating to the end of data transmission (ETX) of continuous communication. On/off information about an RF field (e.g., f, i, l, d, o, and n in Table 5 indicating that a field is on and f i, l, d, o, and f in Table 6 indicating that a field is off) may be included on the basis of at least some of the command fields (e.g., field 4 to field 9). In the case for when a field is on, "fildon" indicating a field-on state may be set up using field 4 to field 9, and in the case for when a field is off, "fildof" indicating a field-off state may be set up using field 4 to field 9. The on/off information about the RF field (e.g., a field value) may be expressed as various values (e.g., a numerical value or an American Standard Code Information Interchange (ASCII) code) capable of indicating RF field on/off.

An example in which the electronic device 101 operates as a target will be described with reference to the second element 430.

The service start module 431 may determine whether to start a service (e.g., to initiate NFC) in response to an RF signal received from an electronic device operating as an initiator (hereinafter, the first electronic device 210) and may generate and transmit an RF response signal for starting the service to the first electronic device 210. Upon initiating NFC, the service start module 431 may set the operating mode of the electronic device 101 to a card emulation mode.

The device response module 432 may transmit a response signal to the first electronic device 210 in response to a device detection (or a search) request from the first electronic device 210 upon initiating NFC. Although the device detection module 412 and the device response module 432 are illustrated as being logically separated from each other, the device detection module 412 and the device response module 432 may be configured as a single module.

The application response module 433 may transmit application information (AID) about the second electronic device 220 to the first electronic device 210 in response to an application information (AID) request from the first electronic device 210. Although the application selection module 413 and the application response module 433 are illustrated as being logically separated from each other, the application selection module 413 and the application response module 433 may be configured as a single module.

A second packet setup module 434 may set up a packet structure for data. The second packet setup module 434 may set up the packet length of data used in data communication with the first electronic device 210. The second packet setup module 434 may set up a short packet or a long packet for the data used in the data communication on the basis of information about a packet structure, as illustrated in Table 3 or Table 4, received from the first electronic device 210. Although the first packet setup module 414 and the second packet setup module 434 are illustrated as being logically separated from each other, the first packet setup module 414 and the second packet setup module 434 may be configured as a single module.

A second command manager 435 may perform continuous command processing, rather than one-off command processing, for continuous data communication (e.g., repeated data transmission and reception). When continuous data communication is detected, the second command manager 435 may continuously receive a relevant command in response to a change (e.g., a decrease) of a set-up command count according to the data size of one long packet. For example, the second command manager 435 may repeatedly receive a sub-packet divided according to the data size (or file unit) set for one long packet and a command associated therewith. The second command manager 435 may receive a first command and may process a first sub-packet associated therewith. Then, when the first sub-packet is completely received (e.g., when the command count is decremented by one), the second command manager 435 may receive a second command, which follows the first command, and may process a second sub-packet associated therewith. The second command manager 435 may continuously receive individual sub-packets until the command count is 0, thus processing the sub-packets as one packet (or data). The second command manager 435 may transmit a command to software (e.g., firmware) in the electronic device 101 (e.g., the target device), may receive a response to the command from the software in the electronic device 101, and may process data on the basis of the received response. For example, for continuous data communication (e.g., repeated data transmission and reception), the second command manager 435 may transmit successive commands for data processing of a long packet to the software in the electronic device 101, and may continuously process data received from the initiator upon continuously receiving a response to the successive commands from the software.

The illustrative configuration of the elements 410 and 430 described with reference to FIG. 4 enables repeated data transmission and reception between an initiator (e.g., the first electronic device 210) and a target (e.g., the second electronic device 220) after a protocol setup operation between the initiator and the target. For example, in NFC between the initiator and the target, it is possible to enable continuous communication (e.g., loop communication) in a manner similar to the communication characteristics found in cable connection based communication.

The function processing module 400 may further include an additional component in addition to the above-described components, such as an interface (or an interface module) for interfacing a signal exchanged between an electronic device (e.g., the first electronic device 210 or the second electronic device 220) and the external device 230.

The function processing module 400 may include logic for defining a protocol for NFC communication. For example, the logic may define a card emulation mode and a P2P mode according to NFC interface protocol (IP) standards. The P2P mode may include an initiator mode and a target mode. The function processing module 400 may include a buffer memory for buffering data exchanged between the electronic device 101 and the external device 230 or between the initiator and the target. The buffer memory may buffer data in a first-in first-out (FIFO) manner.

According to an embodiment, an electronic device includes a communication interface configured for contactless communication (e.g., NFC, RFID communication, or MST communication) with a different electronic device; and a processor, configured to detect a trigger to initiate contactless communication with the different electronic device, determine a communication type associated with communication to be performed with the different electronic device upon detecting the trigger, set at least one parameter associated with continuous communication when the communication type is the continuous communication, and perform the continuous communication with the different electronic device on the basis of the set parameter.

The processor may determine an operating mode of the electronic device upon detecting the trigger.

The processor may set a mode for the continuous communication when the electronic device is determined to operate as an initiator.

The processor may configure data for the continuous communication when the electronic device is determined to operate as the initiator.

The processor may divide additional data associated with the data into at least one sub-packet on the basis of a set data size.

The processor may configure a command for each sub-packet associated with the data, receive a first response to a first command associated with a first sub-packet from the different electronic device, and continuously transmit a second sub-packet, which follows the first sub-packet, and a second command associated with the second sub-packet to the different electronic device upon receiving the first response.

The processor may determine at least one set state upon transmitting the first command, and perform data recovery associated with the first sub-packet when detecting an error on the basis of the determined state.

The processor may set a command count corresponding to the first sub-packet or the second sub packet, and continuously transmit at least one or more of the first or the second sub-packets up to a final sub-packet on the basis of the command count.

The processor may set a card emulation mode when the electronic device is determined to operate as a target.

The processor may receive a plurality of sub-packets on the basis of the continuous communication with the different electronic device after setting the card emulation mode, and process the received plurality of sub-packets as one piece of data when detecting a final sub-packet on the basis of the command count.

The contactless communication may include at least one of NFC, RFID communication, or MST communication.

Figure 5:
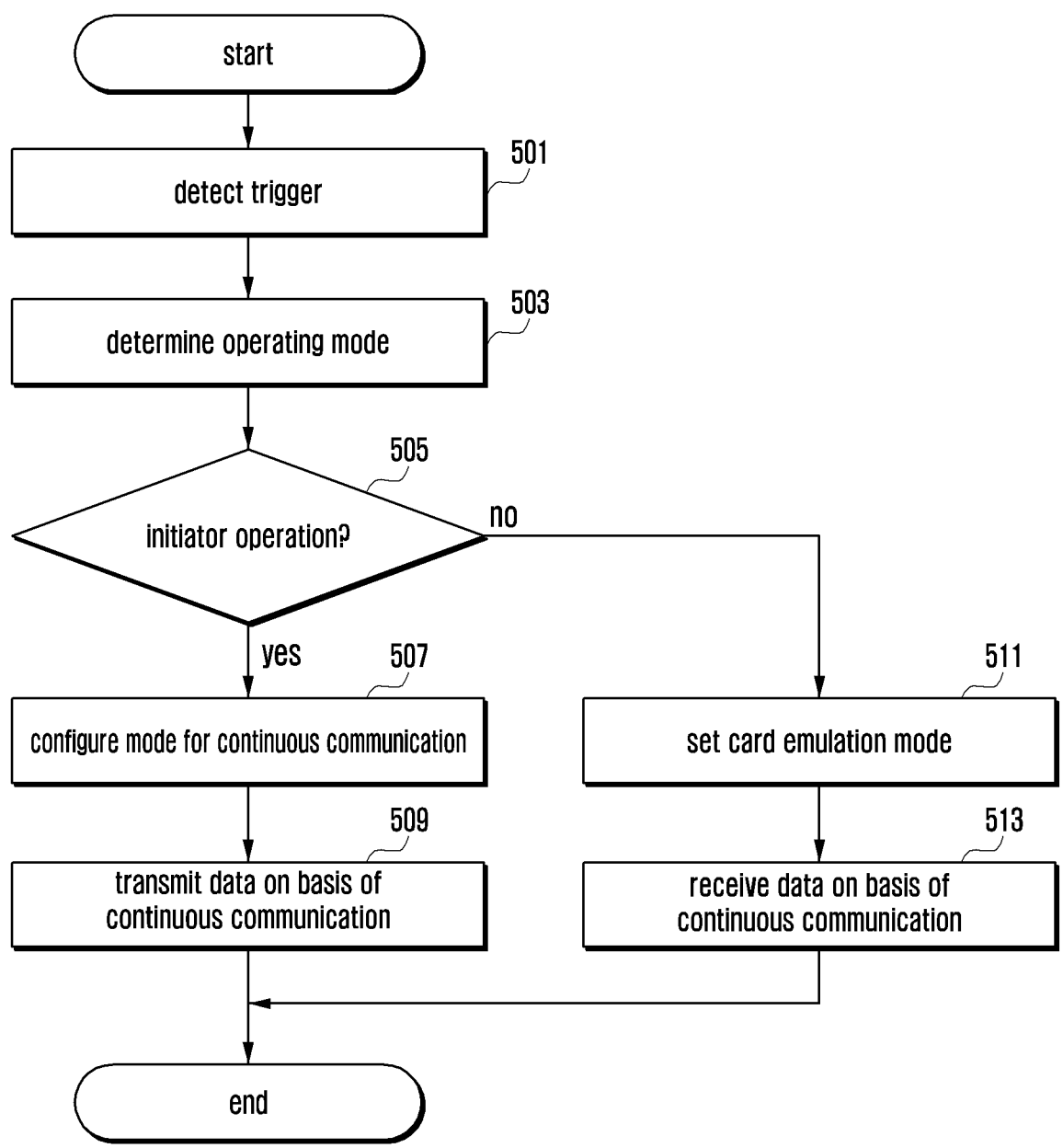
FIG. 5 is a flowchart illustrating an operating method of an electronic device, according to an embodiment.

FIG. 5 is a flowchart illustrating an operating method of an electronic device, according to an embodiment.

Referring to FIG. 5, in step 501, a processor 120 (e.g., at least one processor including processing circuitry) of an electronic device (e.g., the first electronic device 210, the second electronic device 220, or the function processing module 400) detects a trigger. The trigger may indicate that the first electronic device 210 operating as an initiator in NFC or the second electronic device 220 operating as a target in NFC initiates NFC with a counterpart electronic device. The processor 120 may generate an RF field, and may detect the trigger when receiving an RF response signal corresponding to the RF field. The processor 120 may detect the trigger when detecting an RF field generated by the counterpart electronic device.

In step 503, the processor 120 determines the operating mode (or NFC mode) of the electronic device 101. The operational mode may include an initiator mode in which the electronic device 101 operates as an initiator or a target mode in which the electronic device 101 operates as a target.

In step 505, the processor 120 determines whether the electronic device 101 operates as an initiator or a target on the basis of the result of the determination in step 503. When the electronic device 101 outputs an electromagnetic wave (e.g., an RF field) to initiate NFC, the processor 120 may determine that the electronic device 101 operates as an initiator. When the electronic device 101 is a device that is supplied with an operating voltage from an RF field generated by an initiator and transmits an RF response signal accordingly, the processor 120 may determine that the electronic device 101 operates as a target.

When it is determined that the electronic device 101 operates as an initiator in step 505 (e.g., yes in step 505), the processor 120 configures a mode for continuous communication in step 507. The processor 120 may define a packet structure for data for continuous communication. The processor 120 may define a long packet and the data size thereof in the packet structure, may divide the long packet into at least one sub-packet according to the data size (or per file), and may configure a command for each divided sub-packet.

In step 509, the processor 120 transmits the data to a target on the basis of continuous communication. The processor 120 may sequentially transmit sub-packets, into which one long packet is divided, and commands associated therewith to the target in a continuous communication mode. The processor 120 may check a command count and may continuously perform data communication (i.e., continuously transmit data) until the command count is 0.

When it is determined that the electronic device 101 operates as a target in step 505 (e.g., no in step 505), the processor 120 sets the operating mode of the electronic device 101 to the card emulation mode in step 511. Upon determining that the electronic device 101 operates as a target, the processor 120 may set the operating mode of the electronic device 101 for NFC to the card emulation mode so that the electronic device 101 may immediately communicate with the initiator.

In step 513, the processor 120 receives data from the initiator on the basis of continuous communication. The processor 120 may sequentially receive sub-packets into which one long packet is divided. The processor 120 may check a command count for the packet, may continuously receive the sub-packets until the command count is 0, and may process the received sub-packets into one packet upon receiving the final sub-packet.

An operating method for supporting continuous communication in NFC between electronic devices will be described below.

Figure 6:
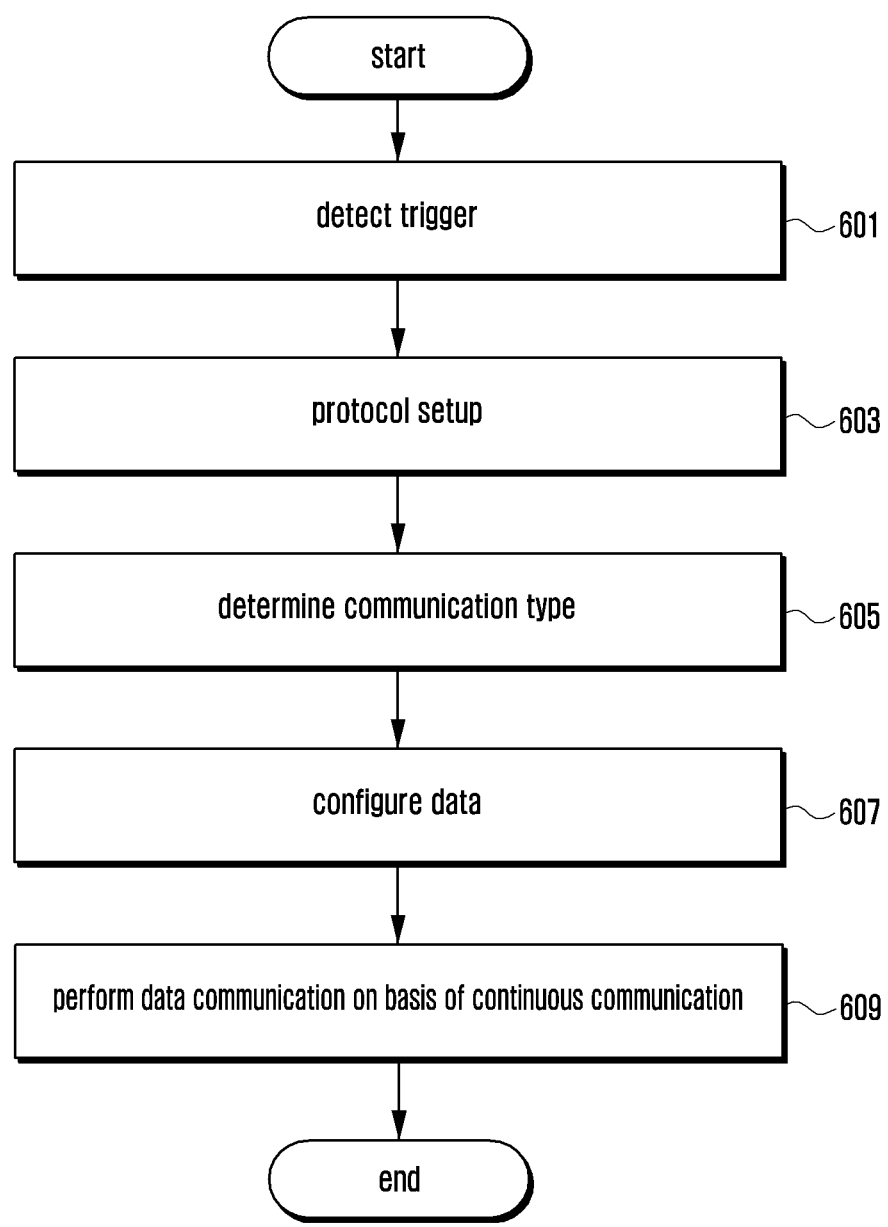
FIG. 6 is a flowchart illustrating an operating method of an electronic device, according to an embodiment.

FIG. 6 is a flowchart illustrating an operating method of an electronic device, according to an embodiment.

FIG. 6 illustrates an example in which an electronic device 101 operates as an initiator (e.g., the first electronic device 210).

Referring to FIG. 6, in step 601, a processor 120 (e.g., at least one processor including processing circuitry) of the electronic device (or the function processing module 400) detects a trigger that initiates NFC.

In step 603, the processor 120 performs a protocol setup operation when NFC is initiated. The processor 120 may set up protocols necessary for NFC with a target, may process a negotiation operation for establishing (or setting up) a communication channel for NFC with the target, and/or may define a logical interface (e.g., an NFC controller interface (NCI)) used to implement NFC between the initiator and the target and may perform the protocol setup operation on the basis of an NFC-data exchange protocol (NFC-DEP). The processor 120 may obtain application information about the target during protocol setup.

In step 605, the processor 120 determines a communication type. The processor 120 may determine whether a communication type is a first type (e.g., continuous communication) or a second type (e.g., one-off communication) at least on the basis of the size of pieces of data to be transmitted, the number of data, or the application information about the target.

In step 607, the processor 120 configures data on the basis the determined communication type. When it is determined that the communication type is the first type, the processor 120 may define a long packet structure for a long command. When it is determined that the communication type is the second type, the processor 120 may define a short packet structure for a short command. Examples of packet structures are illustrated above in Table 3 and Table 4. For example, the processor 120 may set (or limit) the length (e.g., the maximum length) of a data packet and may divide a data packet into a plurality of sub-packets according to the data size and the length of the packet. FIG. 6 illustrates an example in which continuous communication on a long packet is performed instead of one-off communication based on a short packet.

In step 609, the processor 120 performs data communication in a continuous communication mode. The processor 120 may transmit a first sub-packet and a first command associated therewith, and may transmit a second sub-packet, which follows the first sub-packet, and a second command associated therewith when (e.g., after) the first sub-packet is completely transmitted (e.g., when a command count is decreased by one). The processor 120 may continuously transmit the individual sub-packets until the command count is 0, thus processing the sub-packets as one packet (or item of data). The processor 120 may transmit the first command for the first sub-packet to the target, and may successively transmit the second sub-packet and the second command associated therewith upon receiving a first response transmitted (or forwarded) by the target in response to the first command (or with respect to the first command).

Figure 7:
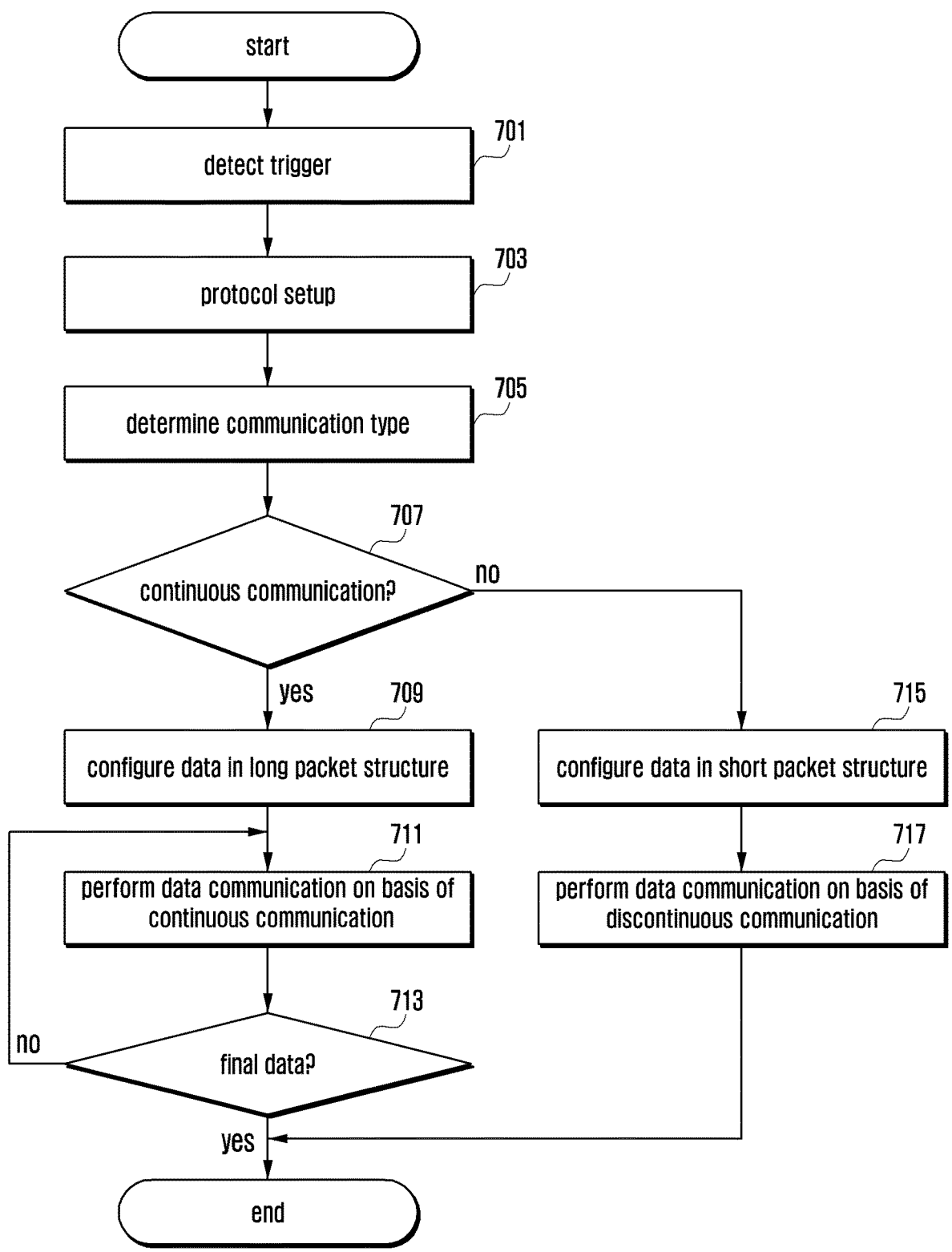
FIG. 7 is a flowchart illustrating an operating method of an electronic device, according to an embodiment.

FIG. 7 is a flowchart illustrating an operating method of an electronic device, according to an embodiment.

FIG. 7 illustrates an example in which an electronic device 101 operates as an initiator (e.g., the first electronic device 210).

Referring to FIG. 7, in step 701, a processor 120 (e.g., at least one processor including processing circuitry) of the electronic device (or the function processing module 400) detects a trigger that initiates NFC.

In step 703, the processor 120 performs a protocol setup operation when NFC is initiated. The processor 120 may process a negotiation operation for establishing (or setting up) a communication channel (or communication session) for NFC between the initiator and a target.

In step 705 and step 707, the processor 120 determines a communication type. The processor 120 may determine at least one piece of communication information, such as the size of data to be transmitted, the number of pieces of data, or application information about the target, and may determine whether a communication type is a first type (e.g., continuous communication) or a second type (e.g., one-off communication) at least on the basis of the determined communication information.

When it is determined that the communication type is the first type of continuous communication in step 707 (e.g., yes in step 707), the processor 120 configures data in a long packet structure in step 709. The processor 120 may define a long packet structure for a long command as illustrated in Table 4. For example, the processor 120 may set (or limit) the length (e.g., the maximum length) of a data packet, may divide a data packet into a plurality of sub-packets according to the data size and the length of the packet, and may configure commands for the respective sub-packets.

In step 711, the processor 120 performs data communication in a continuous communication mode. The processor 120 may transmit a first sub-packet and a first command associated therewith, and may transmit a second sub-packet, which follows the first sub-packet, and a second command associated therewith when (e.g., after) the first sub-packet is completely transmitted (e.g., when a command count is decreased by one). The processor 120 may transmit the first command for the first sub-packet to the target, and may successively transmit the second sub-packet and the second command associated therewith upon receiving a first response transmitted by the target in response to the first command (or with respect to the first command).

In step 713, the processor 120 determines whether the data to be transmitted is final data (e.g., sub-packet) while performing continuous communication. The processor 120 may detect data for which the command count is 0 as final data.

When no final data is detected in step 713 (e.g., no in step 713), the processor 120 performs step 711 and a step 713. The processor 120 may continuously transmit the sub-packets until the command count is 0 (or until final data is detected), thus processing the sub-packets as one packet (or data).

When final data is detected in step 713 (e.g., yes in step 713), the processor 120 terminates the data transmission operation. The processor 120 may maintain the connection of a communication channel (or communication session) with the target even when terminating data transmission. The processor 120 may also perform disconnection from the target at the time of completing the data transmission according to preset information about the continuous communication.

When it is determined that the communication type is the second type of discontinuous communication (or one-off communication) in step 707 (e.g., no in step 707), the processor 120 configures data in a short packet structure in step 715. The processor 120 may define a short packet structure for a short command (e.g., one-off communication) as illustrated in Table 3.

In step 717, the processor 120 performs data communication in a discontinuous communication mode. The processor 120 may transmit a data packet and a command associated therewith and may immediately terminate the data transmission operation. The processor 120 may maintain the connection of the communication channel (or communication session) with the target even when terminating data transmission. The processor 120 may also perform disconnection from the target at the time of completing the data transmission according to preset information about the discontinuous communication.

Figure 8:
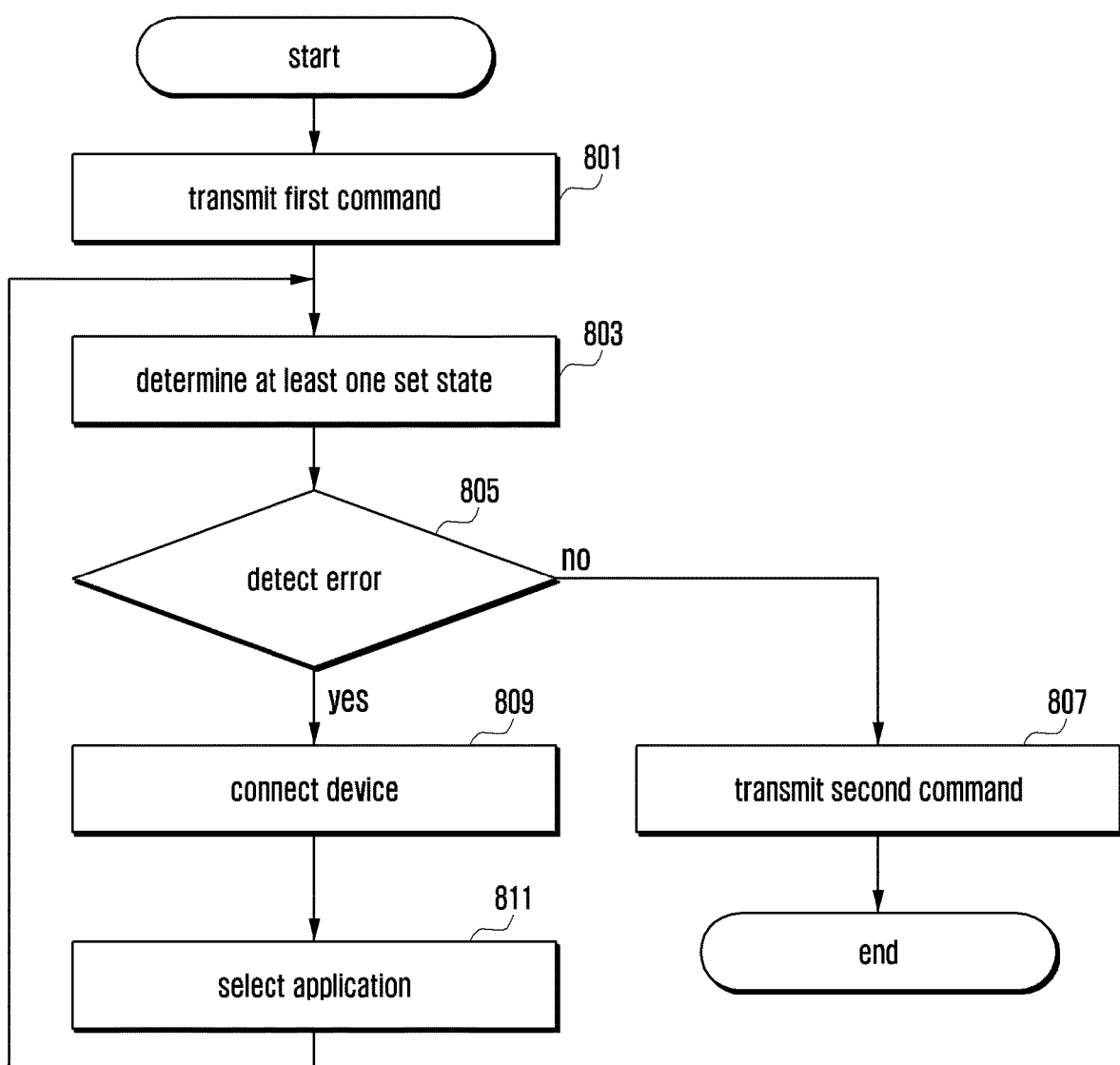
FIG. 8 is a flowchart illustrating an operating method of an electronic device, according to an embodiment.

FIG. 8 is a flowchart illustrating an operating method of an electronic device, according to an embodiment.

FIG. 8 illustrates an example of an operation of processing an error that may occur during continuous communication between an initiator and a target when an electronic device operates as an initiator (e.g., the first electronic device 210).

Referring to FIG. 8, in step 801, a processor 120 (e.g., at least one processor including processing circuitry) of the electronic device (or the function processing module 400) transmits a first command to a target. The processor 120 may transmit the first command for a first sub-packet to the target in a continuous communication mode.

When the first command is transmitted, the processor 120 determines (or monitors) at least one set state in step 803. The processor 120 may monitor a state for error (failure) detection (e.g., a first state, a second state, and a third state) in connection with continuous communication with the target. The state for error detection may be, for example, a no-tag (e.g., no-service) state (e.g., a first state), a lockup state (e.g., a second state), or a disconnected state (e.g., a third state) of the target.

In step 805, the processor 120 determines whether an error is detected on the basis of the determined state. When at least one set state, such as the first state, the second state, or the third state, is detected on the basis of the monitoring result, the processor 120 may determine that an error has occurred.

When no error is detected in step 805 (e.g., no in step 805), the processor 120 transmits a second command to the target in step 807. The processor 120 may transmit the second command for a second sub-packet to the target in the continuous communication mode.

When an error is detected in step 805 (e.g., yes in step 805), the processor 120 performs a device connection operation in step 809. When an error occurs in the continuous communication mode, the processor 120 may perform temporary disconnection (or separation) from the target and may attempt to reconnect to the target. The processor 120 may perform on-off (e.g., RF field on/off) control of electromagnetic waves (or RF field) that enables the initiator to supply power to the target. Examples of defining an RF field on/off function are illustrated in Table 5 and Table 6.

In step 811, the processor 120 selects an application. The processor 120 may reset application information (AID) about an application for continuous communication with an application on the target. The processor 120 may request application information about an application automatically fed back by the target in response to reception of data. The processor 120 may configure application information on the basis of the application information received from the target. An example of configuring application information (AID) is illustrated in Table 2.

After performing step 809 and step 811, the processor 120 proceeds to step 803 and performs step 803 and subsequent operations. For example, the processor 120 may determine a state in step 803, and may transmit the second command in step 807 when no error is detected, thereby continuing data transmission by resolving an error.

Figure 9:
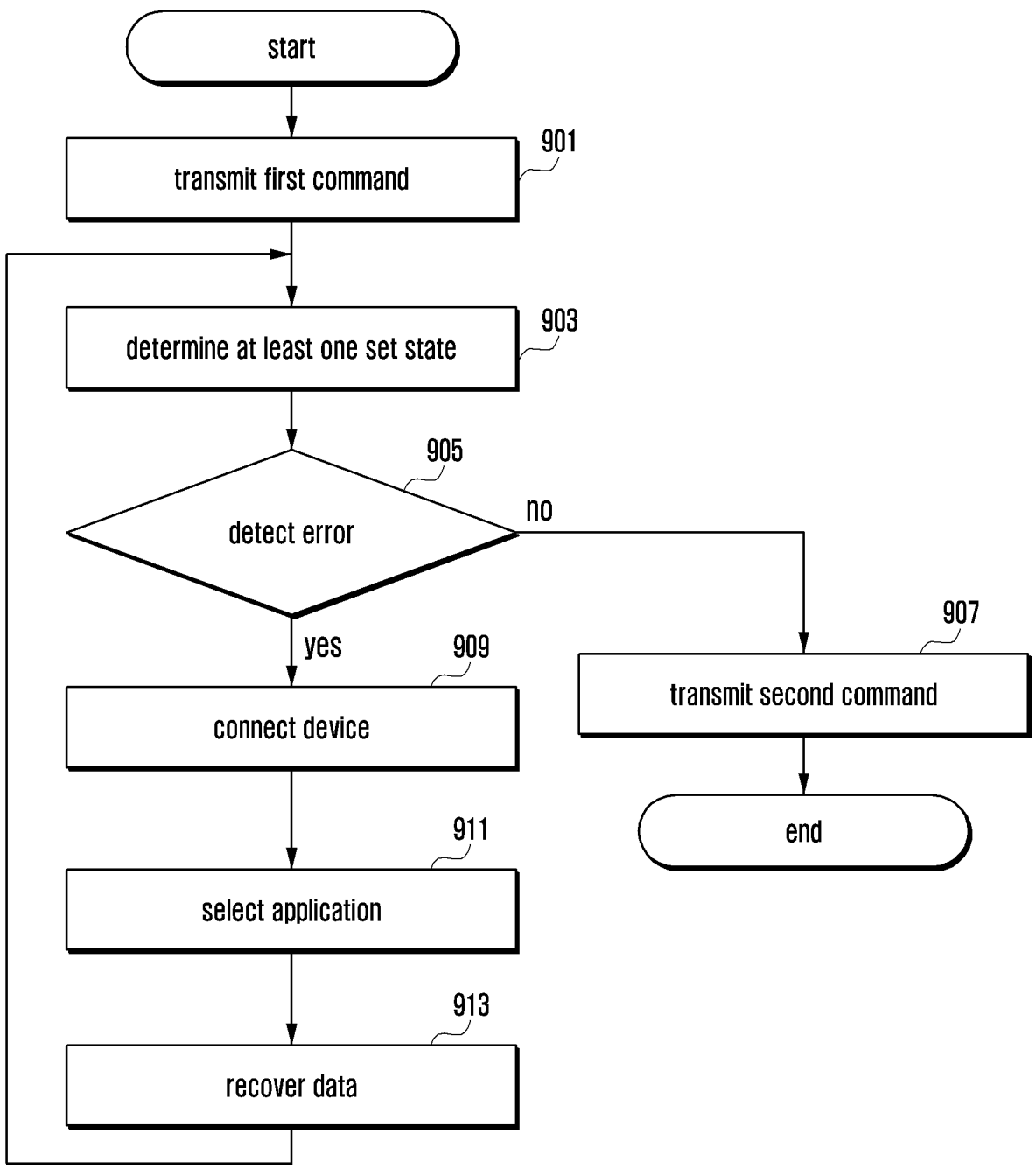
FIG. 9 is a flowchart illustrating an operating method of an electronic device, according to an embodiment.

FIG. 9 is a flowchart illustrating an operating method of an electronic device, according to an embodiment.

FIG. 9 illustrates an example in which an electronic device 101 operates as an initiator (e.g., the first electronic device 210). FIG. 9 illustrates an example of an operation of processing an error that may occur during continuous communication between an initiator and a target and automatically recovering data upon the occurrence of an error. An operation of processing an error may correspond to that described with reference to FIG. 8, and FIG. 9 may further include an operation of recovering data.

Referring to FIG. 9, in step 901, a processor 120 (e.g., at least one processor including processing circuitry) of the electronic device (or the function processing module 400) transmits a first command to a target. The processor 120 may transmit the first command for a first sub-packet to the target in a continuous communication mode.

When the first command is transmitted, the processor 120 determines (or monitors) at least one set state in step 803. The processor 120 may monitor a state for error (failure) detection (e.g., a first state, a second state, and a third state). The state for error detection may be, for example, a no-tag state, a lockup state, or a disconnected state of the target.

In step 905, the processor 120 determines whether an error is detected on the basis of the determined state. When at least one set state, such as the first state, the second state, or the third state, is detected on the basis of the monitoring result, the processor 120 may determine that an error has occurred.

When no error is detected in step 905 (e.g., no in step 905), the processor 120 transmits a second command to the target in step 907. The processor 120 may transmit the second command for a second sub-packet to the target in the continuous communication mode.

When an error is detected in step 905 (e.g., yes in step 905), the processor 120 performs a device connection operation in step 909. When an error occurs in the continuous communication mode, the processor 120 may perform temporary disconnection (or separation) from the target and may attempt to reconnect to the target. The processor 120 may perform on-off (e.g., RF field on/off) control of electromagnetic waves (or RF field) that enables the initiator to supply power to the target.

In step 911, the processor 120 selects an application. The processor 120 may reset application information (AID) about an application for continuous communication with an application on the target.

In step 913, the processor 120 recovers data. When an error occurs during repeated data transfer (e.g., continuous communication) between the initiator and the target, the processor 120 may perform automatic recovery of relevant data. When an error is detected during continuous communication, a packet (e.g., a sub-packet) transmitted at the corresponding time may be subject to loss (e.g., packet loss). Thus, data may be recovered by retransmitting a packet (e.g., retransmitting data) transmitted at the time when an error is detected. The processor 120 may recover data by retransmitting the first sub-packet associated with the first command.

After performing step 913, the processor 120 may go to step 903 and may perform step 903 and subsequent operations. For example, the processor 120 may determine a state in step 903, and may transmit the second command in step 907 when no error is detected, thereby continuing data transmission by resolving an error.

According to an embodiment, an operating method of an electronic device includes detecting a trigger to initiate contactless communication (e.g., NFC, RFID communication, or MST communication) with a different electronic device, determining a communication type associated with communication to be performed with the different electronic device upon detecting the trigger, setting at least one parameter associated with continuous communication when the communication type is the continuous communication, and performing the continuous communication with the different electronic device on the basis of the set parameter.

Detecting the trigger may include determining an operating mode of the electronic device upon detecting the trigger.

Determining the operating mode may include setting a mode for the continuous communication when the electronic device is determined to operate as an initiator.

Setting the parameter may include configuring data for the continuous communication when the electronic device is determined to operate as the initiator.

Configuring the data may include dividing additional data associated with the data into at least one sub-packet on the basis of a set data size.

Performing the continuous communication may include configuring a command for each sub-packet associated with the data, receiving a first response to a first command associated with a first sub-packet from the different electronic device, and continuously transmitting a second sub-packet, which follows the first sub-packet, and a second command associated with the second sub-packet to the different electronic device upon receiving the first response.

Performing the continuous communication may include determining at least one set state upon transmitting the first command, and performing data recovery associated with the first sub-packet when detecting an error on the basis of the determined state.

Performing the continuous communication may include setting a command count corresponding to the first sub-packet or the second sub-packet, and continuously transmitting one or more of the first or the second sub-packets up to a final sub-packet on the basis of the command counter.

Determining the operating mode may include setting a card emulation mode when the electronic device is determined to operate as a target.

Performing the continuous communication may include receiving a plurality of sub-packets on the basis of the continuous communication with the different electronic device after setting the card emulation mode, and processing the received sub-packets as one piece of data when detecting a final sub-packet on the basis of a command counter.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a communication interface configured for contactless communication with a different electronic device; and
   a processor configured to:
   detect a trigger to initiate contactless communication with the different electronic device;
   determine whether a communication type to be performed with the different electronic device is a first type of continuous communication or a second type of discontinuous communication, upon detecting the trigger;
   set at least one parameter associated with the continuous communication when the communication type is the first type of the continuous communication;
   perform continuous communication data communication with the different electronic device on the basis of the set parameter; and
   perform discontinuous communication data communication with the different electronic device when the communication type is the second type of the discontinuous communication.

2. The electronic device of claim 1, wherein the processor is further configured to determine an operating mode of the electronic device upon detecting the trigger.

3. The electronic device of claim 2, wherein the processor is further configured to set a mode for the continuous communication when the electronic device is determined to operate as an initiator.

4. The electronic device of claim 3, wherein the processor is further configured to configure data for the continuous communication when the electronic device is determined to operate as the initiator.

5. The electronic device of claim 4, wherein the processor is further configured to divide additional data associated with the data into at least one sub-packet on the basis of a set data size.

6. The electronic device of claim 5, wherein the processor is further configured to:
   configure a command for each sub-packet associated with the data;
   receive a first response to a first command associated with a first sub-packet from the different electronic device; and
   continuously transmit a second sub-packet, which follows the first sub-packet, and a second command associated with the second sub-packet to the different electronic device upon receiving the first response.

7. The electronic device of claim 6, wherein the processor is further configured to:
   determine at least one set state upon transmitting the first command; and
   perform data recovery associated with the first sub-packet when detecting an error on the basis of the determined state.

8. The electronic device of claim 5, wherein the processor is further configured to:
   set a command count corresponding to the first sub-packet or the second sub-packet; and
   continuously transmit at least one or more of the first or the second sub-packets up to a final sub-packet on the basis of the command count.

9. The electronic device of claim 2, wherein the processor is further configured to set a card emulation mode when the electronic device is determined to operate as a target.

10. The electronic device of claim 9, wherein the processor is further configured to:

receive a plurality of sub-packets on the basis of the continuous communication with the different electronic device after setting the card emulation mode; and process the received plurality of sub-packets as one piece of data when detecting a final sub-packet on the basis of a command counter.

11. The electronic device of claim 1, wherein the contactless communication comprises at least one of near-field communication (NFC), radio-frequency identification (RFID) communication, and magnetic secure transmission (MST) communication.

12. An operating method of an electronic device, the method comprising:

detecting a trigger to initiate contactless communication with a different electronic device;

determining whether a communication type to be performed with the different electronic device is a first type of continuous communication or a second type of discontinuous communication, upon detecting the trigger;

setting at least one parameter associated with the continuous communication when the communication type is the first type of the continuous communication;

performing continuous data communication with the different electronic device on the basis of the set parameter; and performing discontinuous data communication with the different electronic device when the communication type is the second type of the discontinuous communication.

13. The method of claim 12, wherein detecting the trigger comprises determining an operating mode of the electronic device upon detecting the trigger.

14. The method of claim 13, wherein determining the operating mode comprises setting a mode for the continuous communication when the electronic device is determined to operate as an initiator.

15. The method of claim 14, wherein setting the parameter comprises configuring data for the continuous communication when the electronic device is determined to operate as the initiator.

16. The method of claim 15, wherein configuring the data comprises dividing additional data associated with the data into at least one sub-packet on the basis of a set data size.

17. The method of claim 16, wherein performing the continuous communication comprises:

configuring a command for each sub-packet associated with the data;

receiving a first response to a first command associated with a first sub-packet from the different electronic device; and continuously transmitting a second sub-packet, which follows the first sub-packet, and a second command associated with the second sub-packet to the different electronic device upon receiving the first response.

18. The method of claim 17, wherein performing the continuous communication further comprises:

determining at least one set state upon transmitting the first command; and performing data recovery associated with the first sub-packet when detecting an error on the basis of the determined state.

19. The method of claim 16, wherein performing the continuous communication comprises:

setting a command count corresponding to the first sub-packet or the second sub-packet; and continuously transmitting one or more of the first or the second sub-packets up to a final sub-packet on the basis of the command count.

20. The method of claim 12, wherein performing the continuous communication comprises:

setting a card emulation mode when the electronic device is determined to operate as a target;

receiving a plurality of sub-packets on the basis of the continuous communication with the different electronic device after setting the card emulation mode; and processing the received sub-packets as one piece of data when detecting a final sub-packet on the basis of a command counter.

* * * * *